US010428988B2

(12) United States Patent
Leonhardt et al.

(10) Patent No.: US 10,428,988 B2
(45) Date of Patent: Oct. 1, 2019

(54) CAM AND GROOVE COUPLING WITH LOCKING WIRE CLIP

(71) Applicant: Mercedes Textiles Ltd., St. Laurent (CA)

(72) Inventors: Duane Leonhardt, Ile Bizard (CA); Soroush Nobari, Saint Lazare (CA)

(73) Assignee: Mercedes Textiles Ltd., St. Laurent, Quebec (CA)

( * ) Notice: Subject to any disclaimer, the term of this patent is extended or adjusted under 35 U.S.C. 154(b) by 314 days.

(21) Appl. No.: 15/154,608

(22) Filed: May 13, 2016

(65) Prior Publication Data

US 2016/0334042 A1   Nov. 17, 2016

Related U.S. Application Data

(60) Provisional application No. 62/162,233, filed on May 15, 2015.

(51) Int. Cl.
*F16L 37/18* (2006.01)
*F16B 2/24* (2006.01)

(52) U.S. Cl.
CPC .............. *F16L 37/18* (2013.01); *F16B 2/248* (2013.01)

(58) Field of Classification Search
CPC ....... F16L 37/18; F16L 37/096; F16L 17/025; F16L 37/084
USPC ......................................... 285/317, 312, 308
See application file for complete search history.

(56) References Cited

U.S. PATENT DOCUMENTS

| | | | | |
|---|---|---|---|---|
| 2,399,119 A | * | 4/1946 | Howell | F16B 21/12 411/530 |
| 3,439,942 A | * | 4/1969 | Moore | F16L 37/18 285/312 |
| 3,807,774 A | * | 4/1974 | Heath, Jr. | F16L 15/08 285/319 |
| 3,941,254 A | * | 3/1976 | Sweger | B61G 5/08 213/76 |
| 4,295,670 A | | 10/1981 | Goodall et al. | |

(Continued)

*Primary Examiner* — David Bochna
*Assistant Examiner* — James A Linford
(74) *Attorney, Agent, or Firm* — Ware, Fressola, Maguire & Barber LLP (57) ABSTRACT

A cam and groove coupling joint has a male coupling having a substantially tubular body that includes a pair of grooves in the body and a female coupling having a substantially tubular body that includes two pairs of lugs on the body and further includes pins that are supported by each pair of lugs. A pair of cam arms are pivotally mounted to the pins between the lugs. The cam arms are movable between an open position in which the male coupling is free to move relative to the female coupling and a closed position in which a cam of each cam arm engages the groove to lock the male coupling inside the female coupling. A wire clip secures the cam arms in the closed position, the wire clip being movable between a secured position in which the wire clip secures the cam arm to prevent opening of the cam arm and an unsecured position in which the cam arm is free to be opened, wherein the wire clip has a first segment of wire extending through holes in the lugs such that the wire clip is able to slide orthogonally with respect to the cam arm while being permanently mounted to the female coupling and wherein the wire clip has a second segment substantially parallel to the first segment that is extendable over the cam arm to secure the cam arm.

7 Claims, 9 Drawing Sheets

(56) References Cited

U.S. PATENT DOCUMENTS

| | | | |
|---|---|---|---|
| 4,402,534 A * | 9/1983 | Keenan | B60T 17/043 |
| | | | 285/69 |
| 4,647,075 A | 3/1987 | Vargo | |
| 4,651,901 A | 3/1987 | Ozdemir | |
| 4,787,770 A * | 11/1988 | Lewis | F16L 35/00 |
| | | | 285/82 |
| 4,871,195 A | 10/1989 | Parrish | |
| 5,295,717 A | 3/1994 | Chen | |
| 5,338,069 A * | 8/1994 | McCarthy | F16L 37/18 |
| | | | 285/312 |
| 5,435,604 A | 7/1995 | Chen | |
| 6,015,168 A | 1/2000 | Fahl | |
| 6,022,055 A | 2/2000 | Coulonvaux et al. | |
| 6,447,016 B2 | 9/2002 | Collier | |
| 8,955,885 B2 | 2/2015 | Dixon | |
| 2001/0045745 A1 | 11/2001 | Collier | |
| 2010/0289260 A1 | 11/2010 | Morton et al. | |

* cited by examiner

CAM AND GROOVE COUPLING WITH LOCKING WIRE CLIP

CROSS-REFERENCE TO RELATED APPLICATIONS

This application claims benefit to U.S. Provisional Patent Application 62/162,233, filed 15 May 2015, which is herein incorporated by reference.

TECHNICAL FIELD

The present invention relates generally to couplings and, in particular, to cam and groove couplings.

BACKGROUND

Cam and groove couplings, also known as cam and groove fittings, cam lock fittings, quick-connect couplings or quick-disconnect couplings, are used to connect two segments of hoses or pipes. A joint is formed by connecting a male coupling with a female coupling. Both male and female couplings are tubular and attach to the ends of a segment of hose or pipe.

The male coupling has a groove on its exterior. The female coupling has an interior diameter sufficiently large to accommodate the male coupling. The female coupling has cam arms that are pivotally mounted between two adjacent parallel lugs. There are typically two pairs of lugs on each female coupling. The two pairs of lugs are usually diametrically opposite each other on the coupling body. Each pair of lugs pivotally supports a respective cam arm assembly. The cam arms pivot on a pin between the lugs to cause the cam to engage the groove. Movement of the cam into the groove locks the male coupling inside the female coupling.

A problem that may arise with such coupling joints is that, when used on vibrating machinery, there is a concern that vibrations can cause the cam arms to open thereby causing decoupling of the joint.

Wire safety clips are inserted through holes in the lugs of the female coupling to prevent the cam arm from opening. One such wire clip is disclosed in U.S. Pat. No. 6,447,016.

A downside of conventional wire clip designs is that extra material is required over the height of the cam arm in order to provide space for the holes through which the clip is inserted. Chains are typically attached to the clips so that the clips are not lost when removed. However, a typical chain-attached clip is still not foolproof because the chain can slip off the clip. Furthermore, in cold weather, it can sometimes be difficult to align the clip with the holes when wearing gloves.

Another conventional approach to this problem is to use an internally locking mechanism such as, for example, a multi-piece spring-loaded lever. U.S. Pat. Nos. 6,015,168 and 5,435,604 5,295,717 disclose locking members housed inside the cam arms. However, internal locking mechanisms have their shortcomings. Not only are these costly to tool but their main drawback is they are much weaker. In some cases, e.g. in cold weather applications, the cam arms must be hammered closed. The multi-piece levers tend to be weaker and are prone to breaking.

In view of these shortcomings of the prior art, an improved locking mechanism remains highly desirable.

SUMMARY

In broad terms, one aspect of the present invention provides a novel wire clip for securing each cam arm (or lever arm) of a cam and groove coupling. This wire clip is permanently mounted and slidable with holes in the holes to prevent the cam arm from opening accidentally due to vibration or impact.

Accordingly, one inventive aspect of the present disclosure is a cam and groove coupling joint that has a male coupling having a substantially tubular body that includes a pair of grooves in the body and a female coupling having a substantially tubular body that includes two pairs of lugs on the body and further includes pins that are supported by each pair of lugs. A pair of cam arms are pivotally mounted to the pins between the lugs. The cam arms are movable between an open position in which the male coupling is free to move relative to the female coupling and a closed position in which a cam of each cam arm engages the groove to lock the male coupling inside the female coupling. A wire clip secures the cam arms in the closed position, the wire clip being movable between a secured position in which the wire clip secures the cam arm to prevent opening of the cam arm and an unsecured position in which the cam arm is free to be opened, wherein the wire clip has a first segment of wire extending through holes in the lugs such that the wire clip is able to slide orthogonally with respect to the cam arm while being permanently mounted to the female coupling and wherein the wire clip has a second segment substantially parallel to the first segment that is extendable over the cam arm to secure the cam arm.

This summary is provided to highlight certain significant inventive aspects but is not intended to be an exhaustive or limiting definition of all inventive aspects of the disclosure. Other inventive aspects may be disclosed in the detailed description and drawings.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals. It should furthermore be noted that the drawings are not necessarily to scale.

DETAILED DESCRIPTION OF EMBODIMENTS

Figure 1:
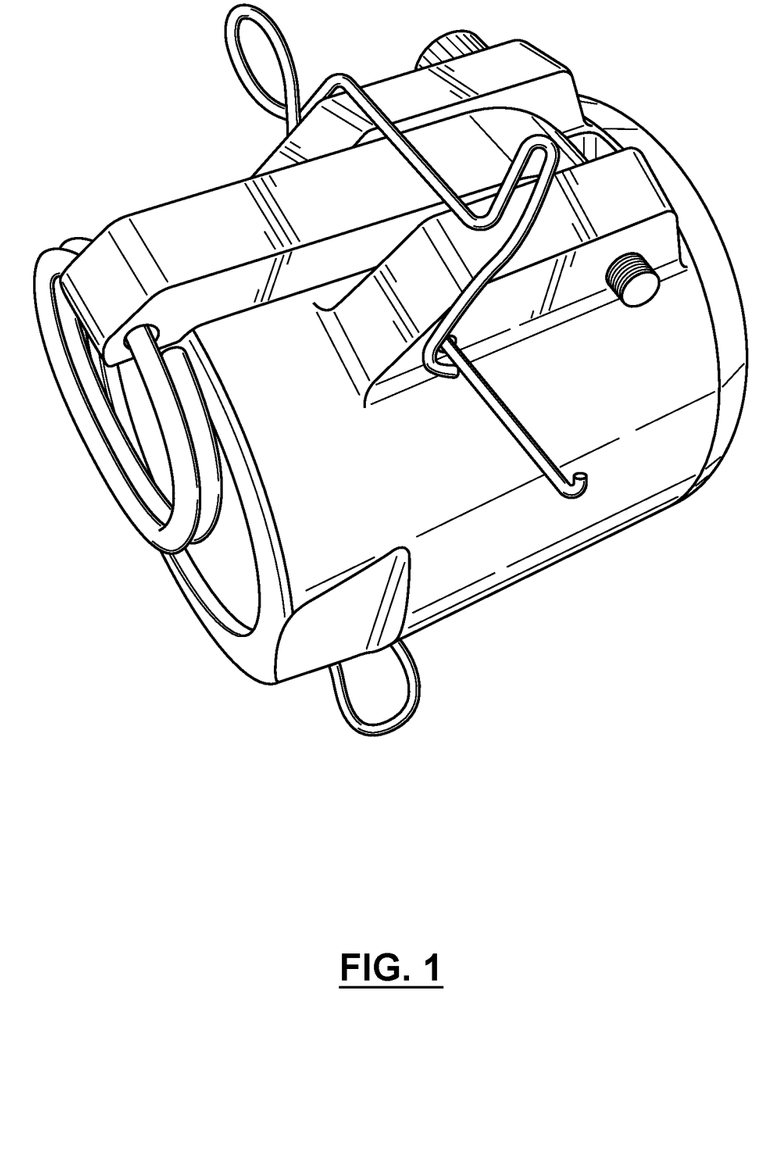
FIG. 1 is a perspective view of the cam and groove coupling joint with the wire clip in a secured position in accordance with one embodiment of the present invention.
Figure 2:
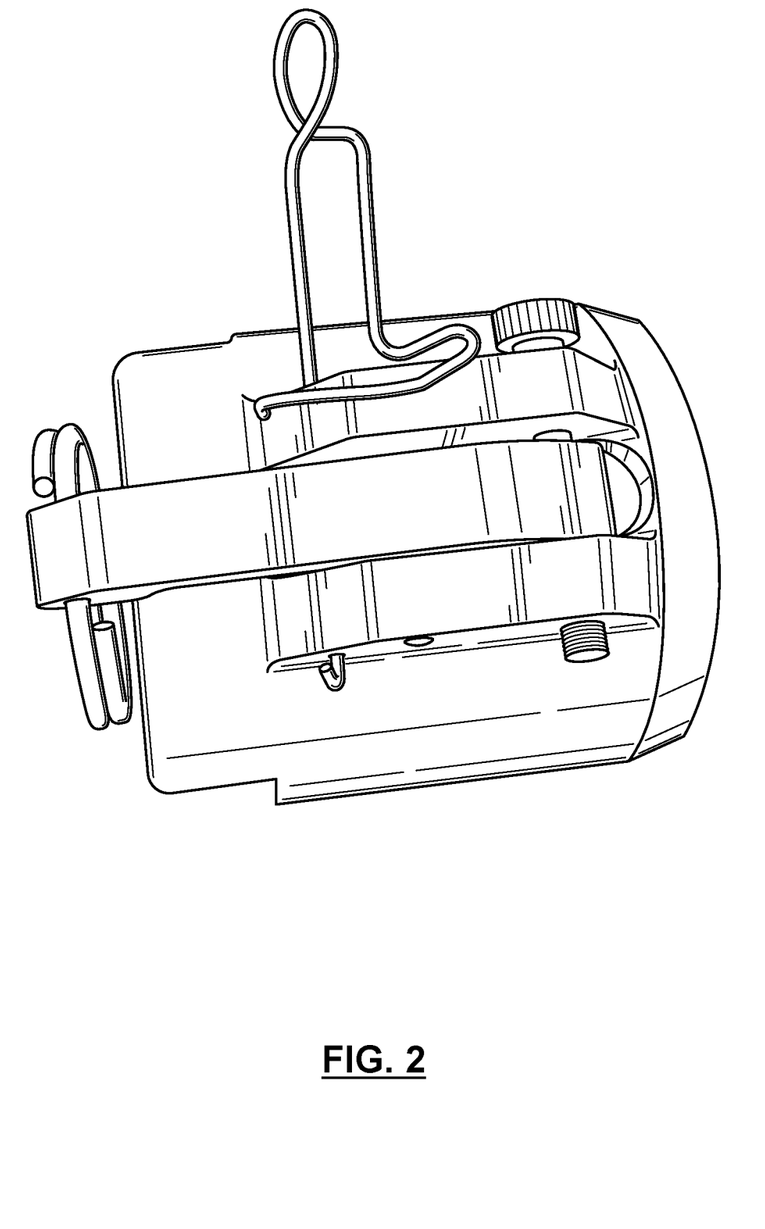
FIG. 2 is a perspective view of the cam and groove coupling joint of FIG. 1 with the wire clip in an unsecured position.
Figure 3:
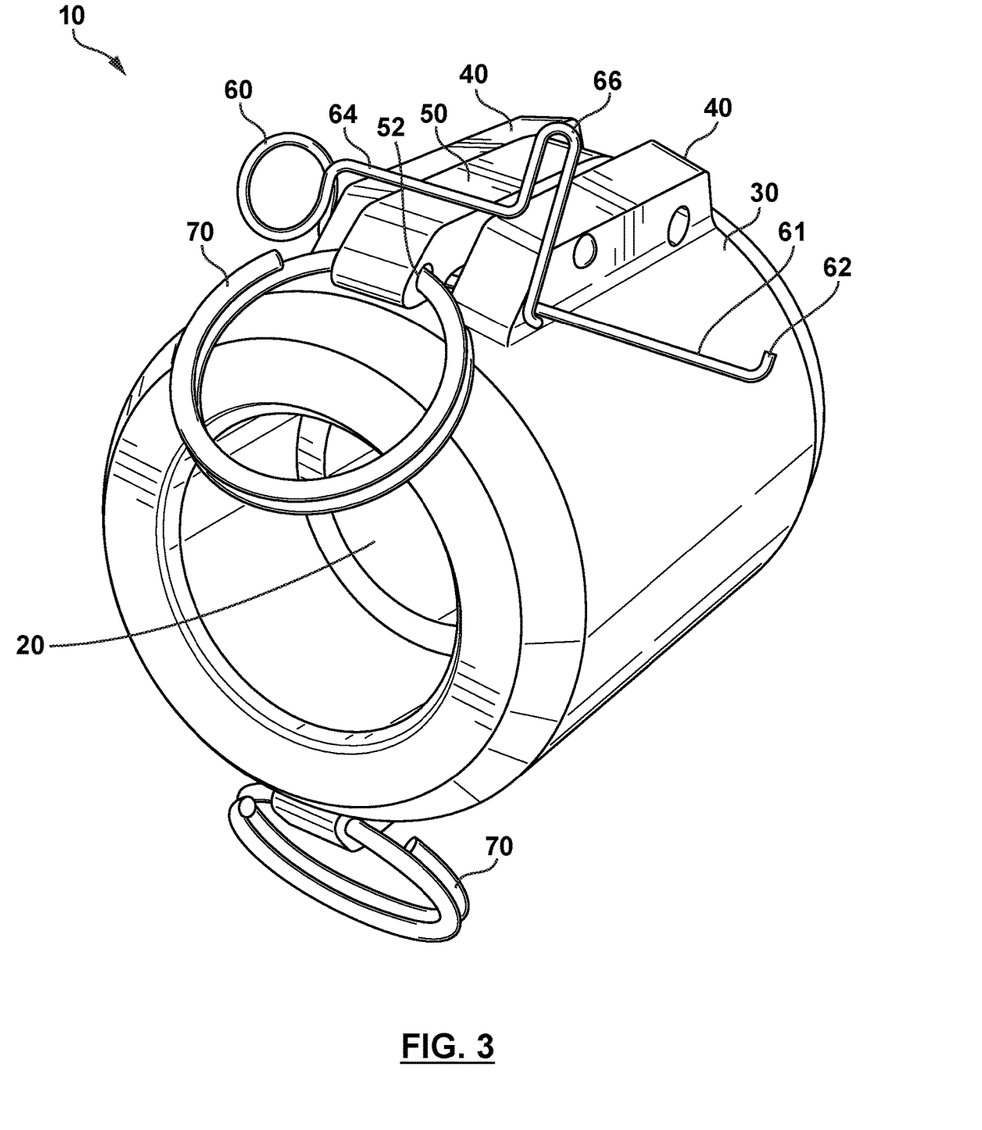
FIG. 3 is a front perspective view of the cam and groove coupling joint with the wire clip in a secured position.
Figure 4:
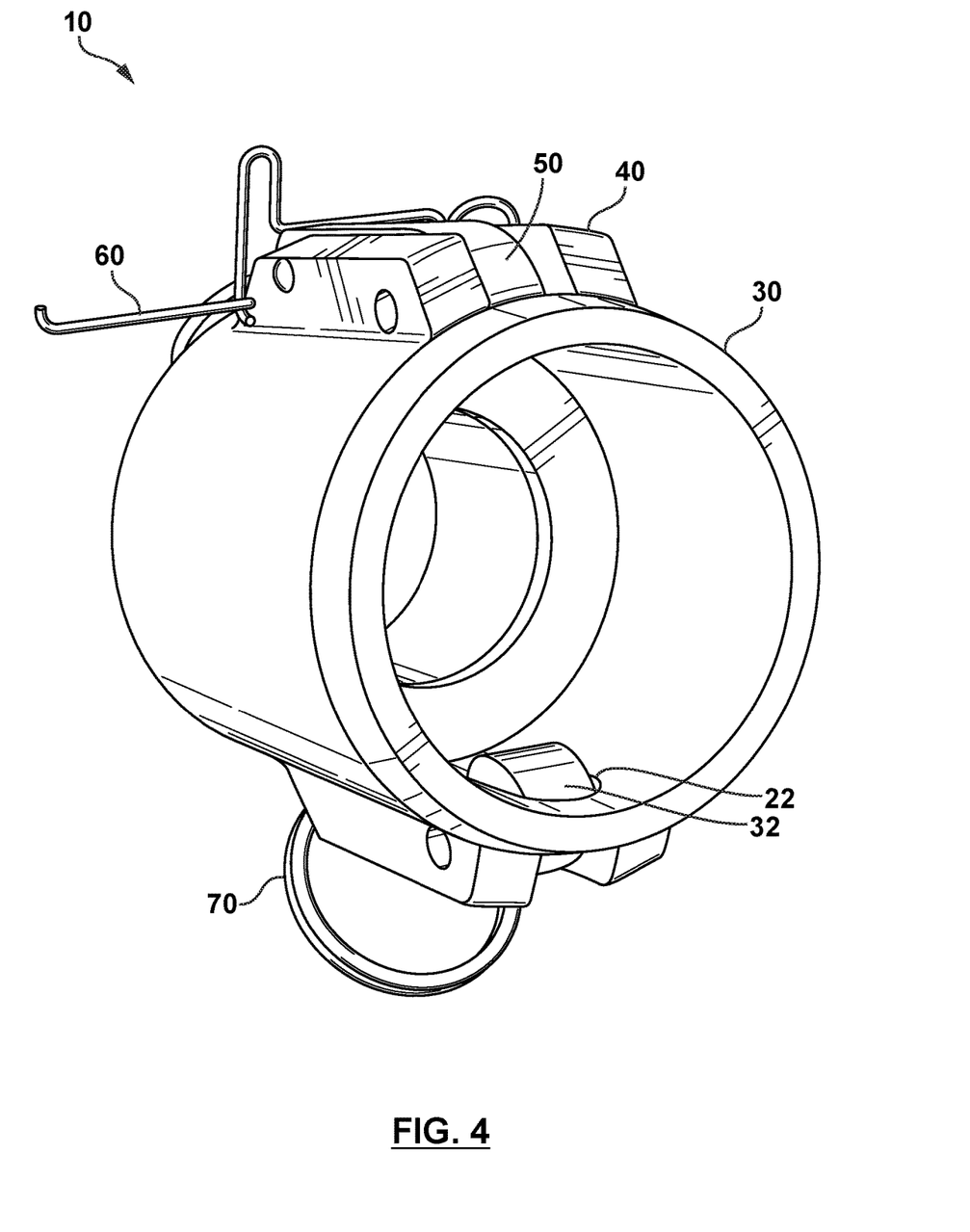
FIG. 4 is a rear perspective view of the cam and groove coupling joint of FIG. 3.
Figure 5:
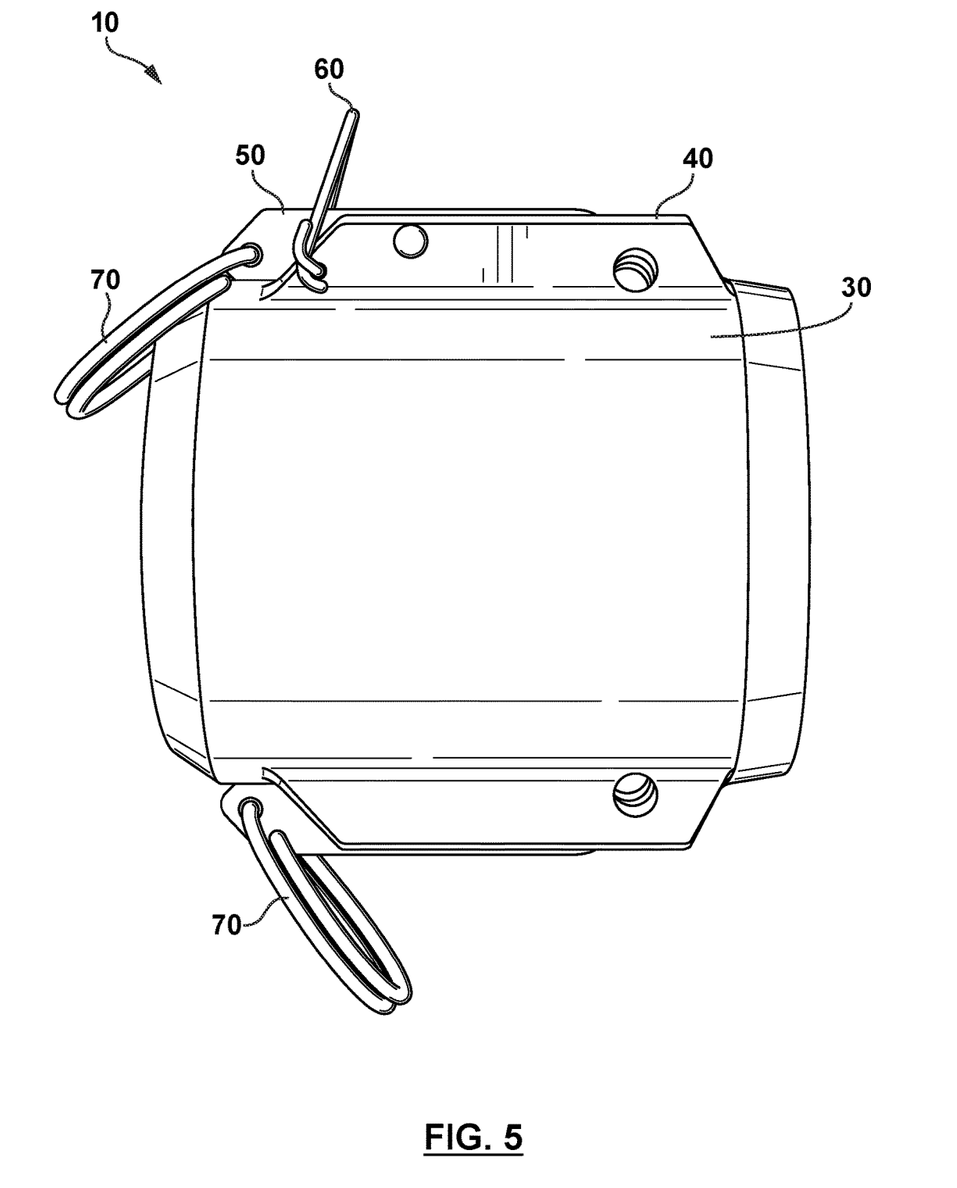
FIG. 5 is a side view of the cam and groove coupling joint of FIG. 3.
Figure 6:
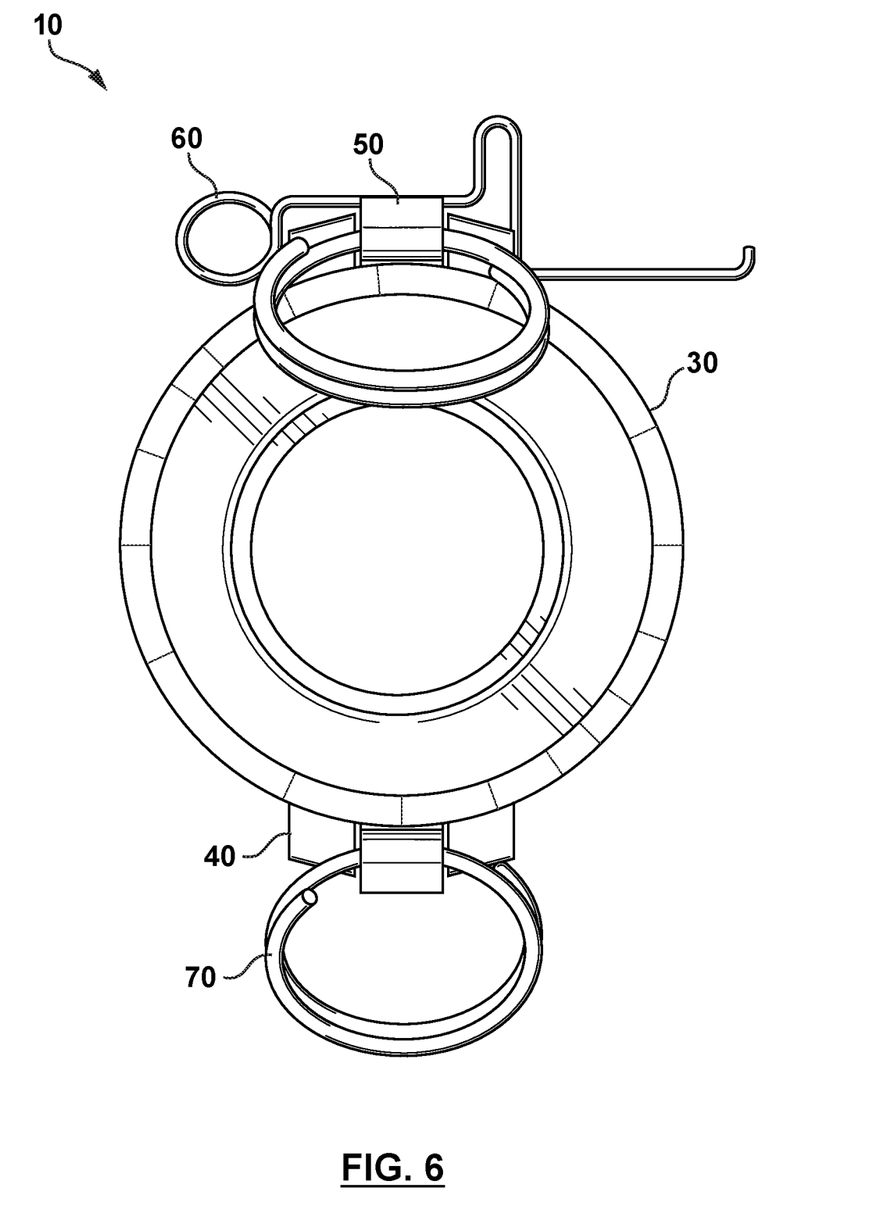
FIG. 6 is a front view of the cam and groove coupling joint of FIG. 3.

In general, the embodiments of the present invention provide a permanently mounted, twist-and-pull wire clip for securing cam arms (lever arms) of a cam and groove coupling joint. A coupling joint is formed by coupling together a male coupling and a female coupling. The male coupling is inserted into the female coupling. Cam arms on the female coupling engage grooves in the male coupling to lock the male coupling inside the female coupling. FIG. 1 shows the wire clip securing the cam arm of the coupling joint. FIG. 2 shows the wire clip pulled out such that the cam arm is unsecured.

In the embodiment illustrated by way of example in FIGS. 3-6, a cam and groove coupling joint 10 has a male coupling 20 having a substantially tubular body that includes a pair of grooves 22 in the body and a female coupling 30 having a substantially tubular body that includes two pairs of lugs 40 on the body and further includes pins that are supported by each pair of lugs. A pair of cam arms 50 are pivotally mounted to the pins between the lugs. The cam arms are movable between an open position in which the male coupling is free to move relative to the female coupling and a closed position in which a cam 32 of each cam arm 50 engages the groove to lock the male coupling inside the female coupling. A twist-and-pull wire clip 60 secures the cam arms in the closed position. The wire clip is slidably mounted within holes in the lug. The wire clip may be twisted (rotated) and then slid laterally from a secured position in which the wire clip secures the cam arm to prevent opening of the cam arm and an unsecured position in which the cam arm is free to be opened.

Figure 7:
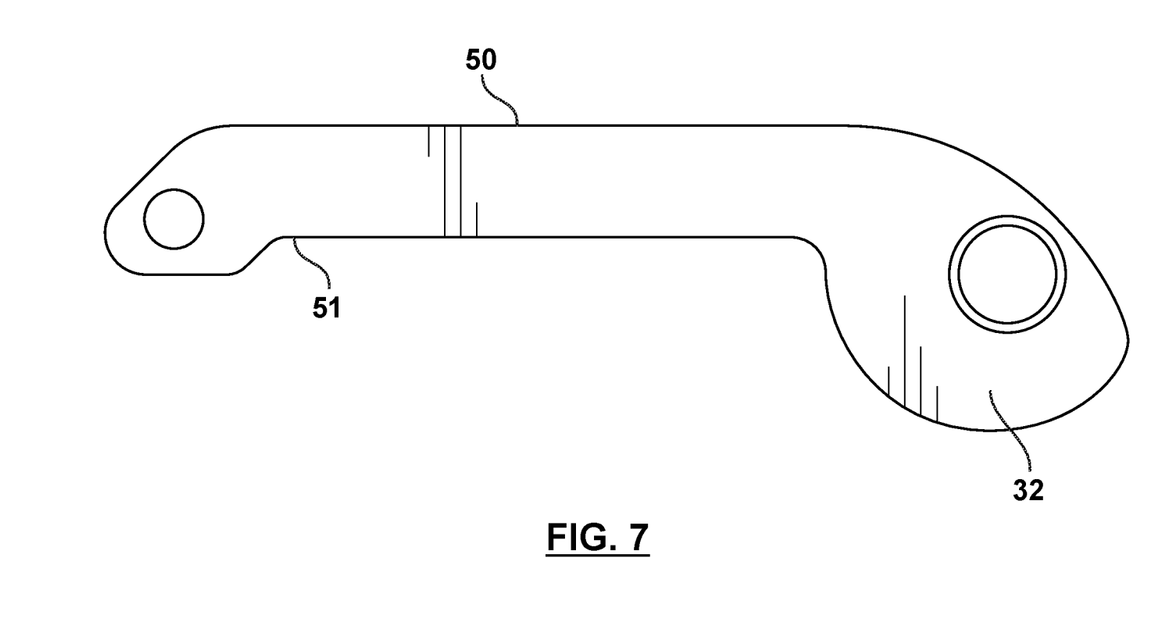
FIG. 7 is a side view of a cam arm.

In the illustrated embodiment, the wire clip 60 has a first segment 61 of wire extending under the cam arm through holes in the lugs such that the wire clip is able to slide orthogonally with respect to the cam arm while being permanently mounted to the female coupling. The wire clip thus has limited lateral movement. The wire clip can also be rotated (twisted) to cause the tang to disengage and re-engage the first and second lugs. Thus, in operation, the user twists/rotates the wire clip to disengage the tang from the first lug. This enables the wire clip to be pulled out through the holes until the end of the first segment abuts the lug. At this maximum extent, the tang is clear of the cam arm. The unsecured cam arm can thus be opened. The cam arm has an underside relief as shown in FIG. 7. The first segment engages this underside relief in the illustrated embodiment. As further illustrated, the wire clip has a second segment 64 substantially parallel to the first segment that is extendable over the cam arm to secure the cam arm in the locked (closed) position. The wire clip may be made of metal. Hooked through an aperture 52 in a forward end of each cam arm is a finger ring 70.

Figure 8:
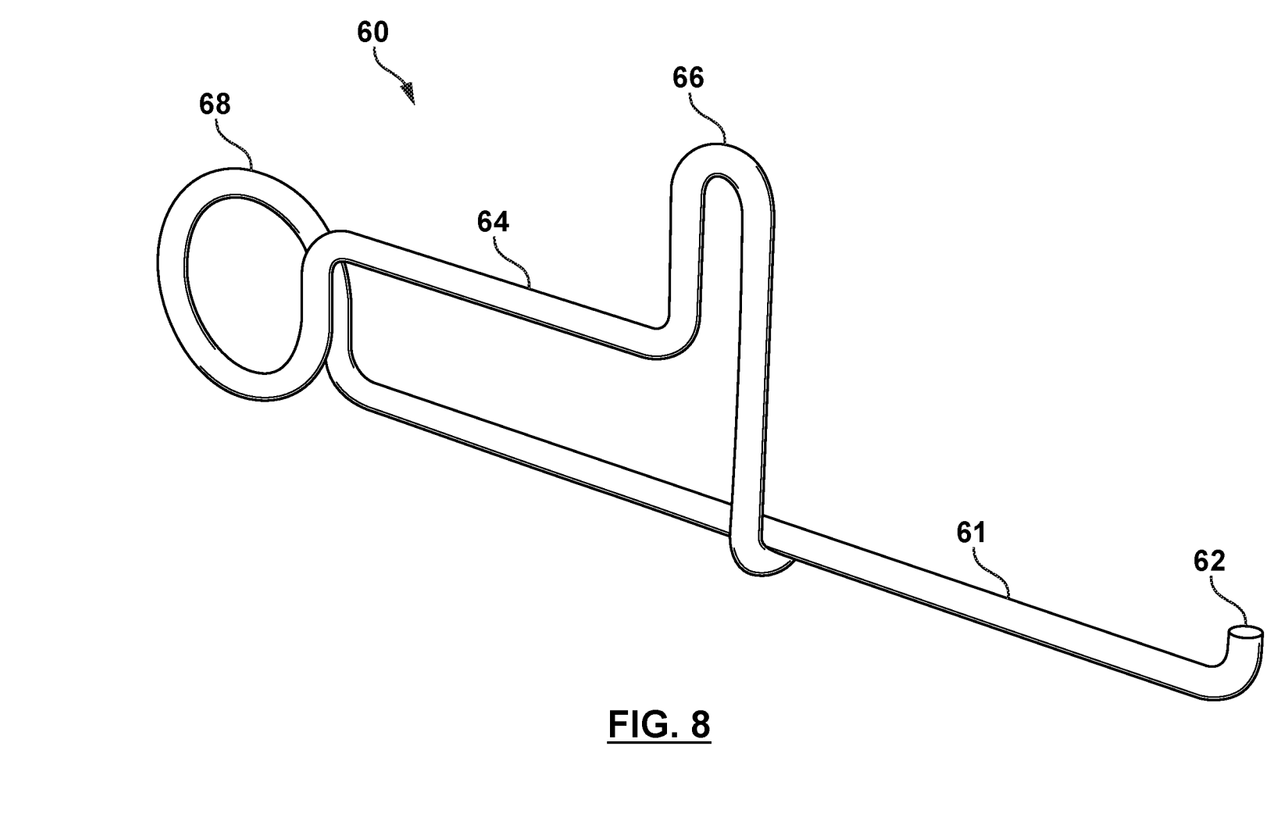
FIG. 8 is a perspective view of the wire clip.
Figure 9:
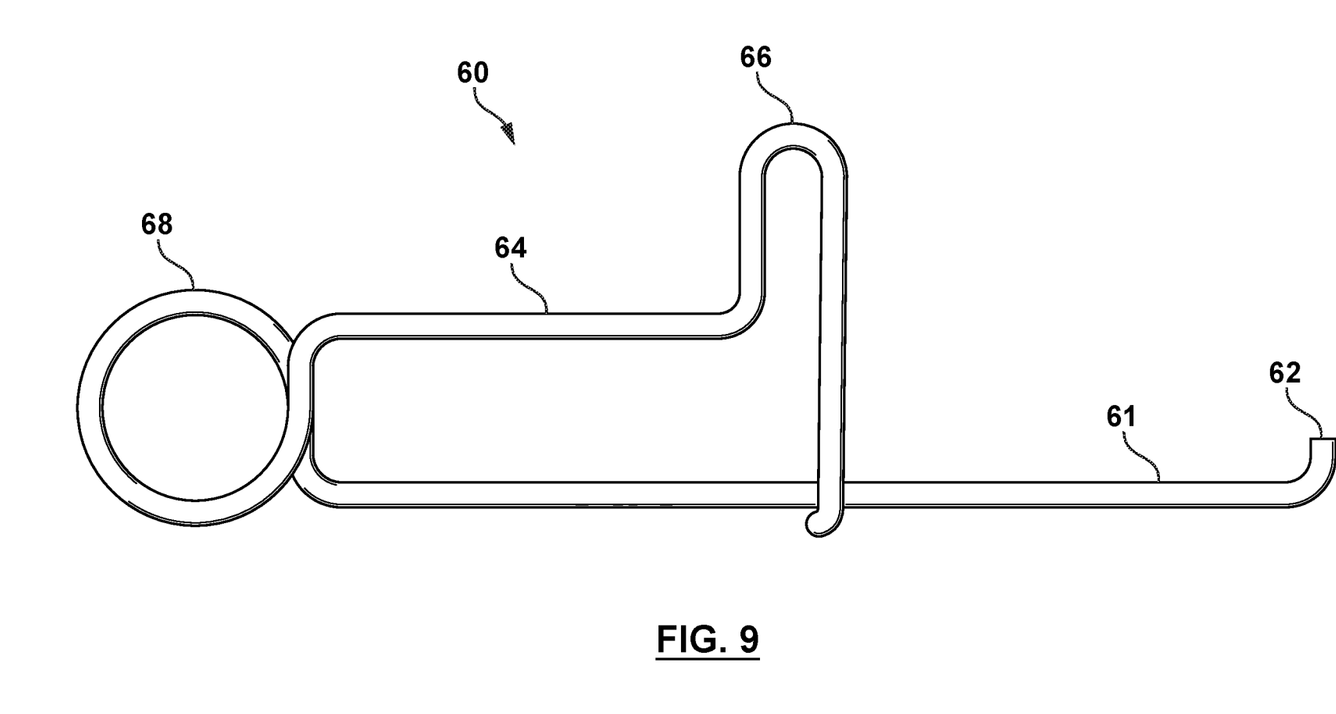
FIG. 9 is a front view of the wire clip.

As illustrated in FIGS. 8-9, the wire clip may comprise a loop 68 (or handle) to enable the wire clip to be manually twisted to thereby rotate the wire clip within the holes about an axis defined by the holes and the first segment. In the illustrated embodiment, an end 62 of the first segment is bent to prevent complete removal of the wire clip from the coupling joint, the end acting as a lateral stop to limit a maximum pull-out of the wire clip.

In the embodiment illustrated, as shown in FIGS. 8-9, the wire clip comprises a tang that, in the secured position, engages a lateral surface of a first lug to prevent the wire clip from being pulled laterally through the holes. Rotation of the wire clip within the holes of the lugs causes, in this embodiment, the tang 66 of the wire clip to rotate out of engagement with the first lug to permit the wire clip to slide orthogonally within the holes. In this embodiment, an end 62 of the first segment 61 is bent to prevent complete removal of the wire clip from the coupling joint, the end 62 acting as a lateral stop to limit a maximum pull-out of the wire clip through the hole in the first lug. The tang 66 in the unsecured position may be configured, as shown in the illustrated embodiment, to abut a second lug to prevent over-rotation of the wire clip.

In the secured (fully closed) position, the upper (second segment) of the wire clip extends over the top of the cam arm to hold the cam arm down, i.e. to prevent accidental opening. The wire clip will oppose a force that would otherwise pull open the cam arm, be it an accidental manual effort, snagging on a foreign object, a glancing impact or the cumulative effect of vibration.

In its unsecured (fully open) position, the cam arm may be opened. To disengage the wire clip, the clip must be first rotated so that the tang is disengaged. The wire clip, after rotation out of engagement with the lug, can then be pulled laterally until the second segment and tang clear the cam arm.

In the illustrated embodiment, the loop 68 is a substantially circular loop. In another embodiment, the loop may have another shape, e.g. oval, oblong, square, rectangular, triangular, etc.

In the illustrated embodiment, the holes are in the forwardly ramped portion of the lugs.

In the illustrated embodiment, the wire clip is made of a single length of metal wire that is bent form the shape shown in FIGS. 8-9. In another embodiment, the wire clip may be made of two or more lengths of wire which are soldered or otherwise joined together.

The embodiments described and illustrated herein secure, hold or restrain the cam arm to prevent it from opening. To open the cam arms, each wire clip is pulled out laterally. After the wire clip has been pulled out, the cam arm is unsecured by the second (upper) segment of the wire clip.

Even with a severe load (which is not likely to arise from vibration and gravity) the lever arm cannot overcome the wire clip as the wire clip will hold the cam arm in place. The only way to open the lever arm is to twist the wire clip until the tang clears the first lug and then to pull the wire clip laterally such that the tang clears the cam arm. This novel lever-securing mechanism enables easy one-handed operation. Since the clip is permanently mounted to the coupling, it remains attached at all times, ensuring that the clip is never lost. Moreover, since there is no chain dangling from the clip, there are no unwanted vibrations from the dangling chain.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including" and "containing" are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

The present invention has been described in terms of specific embodiments, examples, implementations and configurations which are intended to be exemplary or illustrative only. Other variants, modifications, refinements and applications of this innovative technology will become readily apparent to those of ordinary skill in the art who have had the benefit of reading this disclosure. Such variants, modifications, refinements and applications fall within the ambit and scope of the present invention. Accordingly, the scope of the exclusive right sought by the Applicant for the present invention is intended to be limited solely by the appended claims and their legal equivalents.

The invention claimed is:

1. A cam and groove coupling joint comprising:
   a female coupling for receiving a male coupling and having a tubular body that includes two pairs of lugs on the body and further includes pins that are supported by each pair of lugs;
   a pair of cam arms pivotally mounted to the pins between the lugs, the cam arms movable between an open position in which the male coupling is free to move relative to the female coupling and a closed position in which a cam of each cam arm locks the male coupling inside the female coupling; and
   a wire clip for securing a respective cam arm in the closed position, the wire clip being movable between a secured position in which the wire clip secures the respective cam arm to prevent opening of the respective cam arm and an unsecured position in which the respective cam arm is free to be opened, wherein the wire clip has a first segment of wire extending under the respective cam arm and extending through holes in the lugs and wherein the wire clip has a second segment parallel to the first segment that is extendable over the respective cam arm to secure the respective cam arm;
   wherein the wire clip is able to slide orthogonally with respect to the respective cam arm while being permanently connected to the female coupling in both the secured and unsecured positions such that the wire clip cannot be completely removed from the coupling joint and is thereby in direct contact with the coupling joint in both the secured and unsecured positions; and
   wherein the first segment comprises an end that is bent to prevent complete removal of the wire clip from the coupling joint, the end acting as a lateral stop to limit a maximum pull-out of the wire clip through a hole in a first lug, wherein the end that is bent is opposite a loop which connects the first segment and the second segment, and the second segment contains a tang that is perpendicular to the second segment and which partially surrounds the first segment in the secured position.

2. The coupling joint as claimed in claim 1 wherein the wire clip comprises the loop to enable the wire clip to be manually twisted to thereby rotate the wire clip within the holes about an axis defined by the holes and the first segment.

3. The coupling joint as claimed in claim 2 wherein the wire clip comprises the tang that, in the secured position, engages a lateral surface of the first lug to prevent the wire clip from being pulled laterally through the holes.

4. The coupling joint as claimed in claim 3 wherein rotation of the wire clip within the holes of the lugs causes the tang of the wire clip to rotate out of engagement with the first lug to permit the wire clip to slide orthogonally within the holes.

5. The coupling joint as claimed in claim 4 wherein the tang in the unsecured position is configured to abut a second lug to prevent over-rotation of the wire clip.

6. The coupling joint as claimed in claim 1 wherein the holes are in a forwardly ramped portion of the lugs.

7. The coupling joint as claimed in claim 1 wherein the wire clip is made of a single length of metal wire.

\* \* \* \* \*